United States Patent
Tokutomi et al.

(10) Patent No.: US 7,355,393 B2
(45) Date of Patent: Apr. 8, 2008

(54) MAGNETIC HEAD SLIDER TESTING APPARATUS AND MAGNETIC HEAD SLIDER TESTING METHOD

(75) Inventors: Teruaki Tokutomi, Kanagawa (JP); Kyoichi Mori, Kanagawa (JP)

(73) Assignee: Hitachi High-Technologies Corporation, Kanagawa (JP)

( * ) Notice: Subject to any disclaimer, the term of this patent is extended or adjusted under 35 U.S.C. 154(b) by 67 days.

(21) Appl. No.: 11/485,983

(22) Filed: Jul. 14, 2006

(65) Prior Publication Data
US 2007/0013369 A1    Jan. 18, 2007

(30) Foreign Application Priority Data
Jul. 15, 2005   (JP) .............................. 2005-207343

(51) Int. Cl.
*G01R 33/12* (2006.01)
(52) U.S. Cl. ..................................... 324/210
(58) Field of Classification Search ............... 324/202, 324/210, 212, 260, 261
See application file for complete search history.

(56) References Cited

U.S. PATENT DOCUMENTS 5,517,111 A * 5/1996 Shelor ....................... 324/235
6,486,660 B1 * 11/2002 Luse et al. .................. 324/210
6,667,614 B1 * 12/2003 McMahon et al. .......... 324/212
6,943,545 B2 * 9/2005 Patland et al. ............. 324/210

FOREIGN PATENT DOCUMENTS

| JP | 10-124828 | 5/1995 |
| JP | 2000-260012 | 9/2000 |

* cited by examiner

*Primary Examiner*—Reena Aurora
*Assistant Examiner*—Kenneth J Whittington
(74) *Attorney, Agent, or Firm*—Mattingly, Stanger, Malur & Brundidge, PC (57) ABSTRACT

In the present invention, a coil generating DC magnetic field applied to a magnetic head is divided into two in that a first coil and a second coil, which are provided on a frame shape core. An distance of an air gap is shortened, a slider head is held on a table having a top end portion of thin thickness, while advancing and retreating the table in the direction perpendicular to the core, the head slider is inserted into the air gap from the lateral direction. Thereby, the distance of the air gap is reduced to about half of the conventional one and a reduction of inductance of the first coil and the second coil is realized.

15 Claims, 6 Drawing Sheets

MAGNETIC HEAD SLIDER TESTING APPARATUS AND MAGNETIC HEAD SLIDER TESTING METHOD

FIELD OF THE INVENTION

The present invention relates to a magnetic head slider testing apparatus and magnetic head slider testing method, and more specifically, in a testing apparatus of a complex magnetic head having an MR (Magneto Resistive) head, in particular in a magnetic head slider testing apparatus which measures electrical characteristics of the MR head under a slider single body (chip) condition, relates to an improvement in a magnetic head slider testing apparatus, which permits to share in common a current output circuit for DC magnetic field and for high frequency magnetic field and to suppress leakage magnetic field from such as a core and a coil to the surroundings, thereby, realizes size reduction of the apparatus.

High frequency referred to in the present specification and in the appended claims does not imply a frequency of more than 3 MHz used in a radio field, but implies a high frequency with respect to a commercial power source frequency of 100 Hz~200 Hz in an electric power field, and usually implies a frequency in a frequency band of more than 200 Hz.

BACKGROUND ART

With regard to a magnetic head for a hard disc device, recently, for use with an inductive head at writing side, a complex magnetic head (herein after will be called as complex head) in which such as an MR head, GMR head and TMR head (herein after will be represented as MR head) is used at a read out side.

Recording density of a hard disc is steadily increasing such as to a few ten gigabyte/inch. In addition, installations of an HDD to home electric appliances with digital technologies accelerate the density increase. For this reason, a demand for magnetic head assemblies, which are indispensable for the installation of the HDD, is increasing rapidly.

The magnetic head assembly is usually constituted by such as a head slider, which installs a complex head having an MR head and a suspension spring for supporting the same, the head slider is fixed to a head actuator such as a voice coil motor via the suspension spring.

The complex head in the head slider is formed integrally with the slider through a thin film process. Different from the inductive head at a write side, in the MR head defects such as resistance defect, insulation defect between shields and electric characteristic defect are likely caused. Therefore, an electrical characteristic testing of the magnetic heads including such as MR heads is performed under a condition of slider single body.

For a defect testing of a head slider (slider single body condition) prior to assembling into a head assembly, a testing apparatus, which measures a reproducing characteristic of an MR head by applying externally a DC magnetic field to the MR head is disclosed and known from JP2000-260012A.

Further, for testing under assembled condition as a head assembly, a testing of an MR head in which while applying such as an AC recording magnetic field to the MR head and applying externally a DC magnetic field thereto, an output voltage waveform is obtained from the MR head to determine the characteristic is disclosed and known from JPH10-124828A.

The size of a head slider is at most 1 mm square or less and on the side face at the trailing edge of the head slider four or six connection terminals for a complex head are provided. The height of the head slider is about 0.5 mm, and usually the magnetic head is also provided at the trailing edge of the head slider together with the connection terminals. During testing of the head slider (under slider single body condition), if the connection terminals of four or six are not surely contacted with a probe, the testing cannot be performed successfully.

Moreover, when measuring a reproducing characteristic of an MR head under a condition of applying a DC magnetic field externally, in these sorts of testing apparatus, an external magnetic field generating device has to be disposed extremely close to the head slider. Further, the measurement items have to cover a wide range of testing such as quasi-magnetic response characteristic test (QUASI-TEST) of the MR head and hysteresis characteristic test as a magnetic material, and in addition, the testing has to be completed in a short time (about one second) for one piece of head slider.

An MR head is an element, which varies its resistivity in response to the magnetic field generated from data recorded on a medium. Therefore the quasi-magnetic response characteristic test is not a test in which the MR head reads data actually written on a magnetic disc, but a test for determining a reading characteristic in which a like high frequency magnetic field as a written data is applied externally in a quasi manner to the MR head so as to constitute a circumstance as if the MR head received the magnetic field when data are read. This test requires repeating measurement under a same condition about a few hundreds of times. Moreover, the test is required to vary the magnitude and direction of the magnetic field intensity to be applied to the MR head. Namely, an external magnetic field generating device generating a high frequency magnetic field is required which alternates of the magnetic field from 0 to + side of a predetermined level (for example, magnetic field directing downward with respect to the head slider) and then from 0 to − side of a predetermined level (for example, magnetic field directing upward with respect to the head slider).

On the other hand, the hysteresis characteristic test is performed in such a manner that a DC magnetic field is applied externally, while increasing successively the magnetic field intensity (magnitude of the magnetic field) from 0 to + side and then decreasing to return to 0, subsequently the magnetic field intensity of side is increased and the decreased to return to 0. For this reason, it is necessary to generate a DC magnetic field of large intensity. Therefore, provision of another separate external magnetic field generating device is required.

These two separate external magnetic field generating devices require respectively such as a power source and a current output circuit. However, since the test area where the connection terminals of the head slider contact with the probe is limited to one portion, only a single core having an air gap in which magnetic field is generated can be provided therein. For this reason, in these sorts of test apparatus, a fine wire for a high frequency magnetic field generation coil and a thick wire for a DC magnetic field generation coil are wound on the single core. The magnetic field generation efficiency of these coils reduces as the position thereof on the core is separated from the test area. Therefore, if the inductance thereof is not increased, a magnetic field having a desired intensity cannot be generated at the test area (air gap). If the inductance is increased, a leakage magnetic field to the surroundings increases.

When a rectangular frame shaped core is used, in these sorts of magnetic head slider test apparatus, it is difficult to provide two series of coils for the DC magnetic field generation and for the high frequency magnetic field generation on one side having the air gap because of the layout such as of a test stage and test probe provided around the test area. For this reason, the coils have to be provided on the back side opposing to the side having the test area (air gap) as disclosed in FIG. 1 of JPH10-124828A. In this instance, since the position of the coils are remote from the air gap (test area), the inductance (number of their turns) of the coils increases, and an increase of the leakage magnetic field to the surroundings cannot be avoided, which adversely affects the test result and in addition causes a problem of increasing the entire size of the apparatus.

SUMMARY OF THE INVENTION

An object of the present invention is to resolve the above mentioned conventional problems and to provide a magnetic head slider test apparatus which permits to share in common a current output circuit for DC magnetic field and for high frequency magnetic field and to suppress leakage magnetic field from such as a core and a coil to the surroundings.

Another object of the present invention is to provide a magnetic head slider test apparatus, which permits to realize size reduction of the apparatus.

Still another object of the present invention is to provide a magnetic head slider test method, which permits to share in common a current output circuit for DC magnetic field and for high frequency magnetic field and to suppress leakage magnetic field from such as a core and a coil to the surroundings.

A constitution of a magnetic head slider test apparatus according to the present invention, which achieves these objects, in the magnetic head slider test apparatus, which tests a magnetic head characteristic of a slider head under a condition that the slider head has at one side face thereof a plurality of connection terminals to be connected to the magnetic head, is provided with a frame shaped core having an air gap, first and second coil provided on either side of the air gap for generating magnetic field of a predetermined intensity in the air gap, a probe provided for contacting the plurality of connection terminals and a table on which the head slider is mounted and which is able to advance and retreat with respect to the air gap so as to insert the head slider into the air gap, wherein the probe and the table are disposed on either side of the air gap in the direction perpendicular to the core, through advancing the table the slider head is inserted in the air gap and the plurality of the connection terminals are contacted with the probe, for generating a DC magnetic field in the air gap the first coil and the second coil are connected in series and a predetermined drive current is flowed therethough and for generating a high frequency magnetic field in the air gap an AC drive current of more than 200 Hz is flowed through either the first coil or the second coil.

In the constitution of the magnetic head slider test method according to the present invention, a probe and a table are disposed at either side of an air gap in the direction perpendicular to the air gap forming direction of a frame shaped core, on which a first coil and a second coil are provide at either side of the air gap, the method performs the testing comprising the step of mounting the head slider on the table, the step of advancing the table on which the head slider is mounted, inserting the head slider into the air gap and contacting a plurality of connection terminals with the probe, the step of DC magnetic field generation including connecting the first coil and the second coil in series, flowing a predetermined current therethrough and generating a DC magnetic field in the air gap and the step of high frequency magnetic field generation including flowing through either the first coil or the second coil an AC drive current of more than 200 Hz and generating a high frequency magnetic field in the air gap.

As has been explained above, in the present invention, a coil for generating DC magnetic field for the magnetic head is divided into the first coil and the second coil, which are provide on the frame shaped core. Then the distance of the air gap is reduced, the slider head is held on the table having a front edge portion of thin thickness and the head slider is inserted into the air gap from the lateral direction while advancing and retreating the table in the direction perpendicular to the core. Thereby the air gap distance is satisfactory, if the slider head can be inserted sufficiently, thus the distance of the air gap is reduced to about a half of the conventional one. For example, the distance of the conventional air gap of about 12 mm can be reduced down to about 6 mm. As a result, the inductances of the first and second coil can be reduced.

As a result, the inductance of the entire coils is reduced, the number of turns of the coils on the core is reduced, further, by dividing the entire coil into two coils in that the first coil and the second coil the inductance of a single coil can be reduced to about half of the entire coil or less and a coil having a small inductance is allocated to a coil for the high frequency magnetic field generation. Since the inductances of the respective coils formed by dividing into two are small, the size increase thereof is prevented accordingly. When generating a DC magnetic field, since the first and second coils are connected in series, the inductance can be increased.

When the core is formed in a rectangular, in the present invention, the first coil can be provided on the side having the air gap and the second coil can be provided on the other side than the side where the first coil is provided. In the later instance, the number of turns of the second coil can be increased, while the number of turns of the first coil is reduced. Thereby, the first coil can easily generate a high frequency magnetic field and the outer size thereof can be limited. As a result, the first coil can be disposed near the air gap, which improves the magnetic field generation efficiency.

When the coil for the DC magnetic field generation is divided into two as explained above, the necessity of providing two series coils one for the high frequency magnetic field generation using a fine wire and the other for the DC magnetic field generation using a thick wire is eliminated.

As a result, the magnetic head slider testing apparatus according to the present invention permits to share in common a current output circuit for DC magnetic field and for high frequency magnetic field and suppresses the leakage magnetic field from such as a core and a coil to the surroundings. Thereby, the size reduction of the magnetic head slider testing apparatus is realized.

Figure 1:
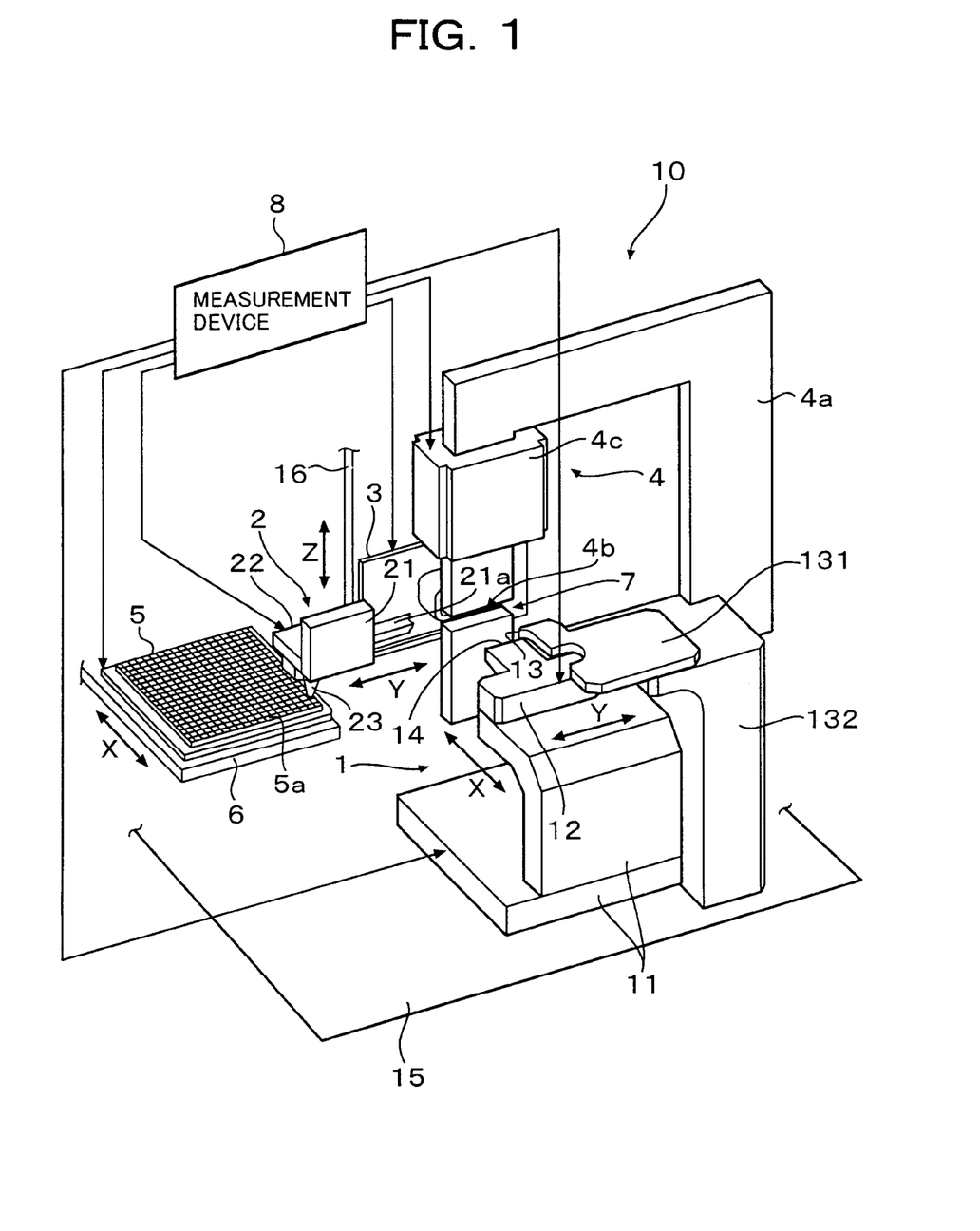
FIG. 1 is an entire constitutional diagram of a magnetic head slider testing apparatus, to which the present invention is applied.

DESCRIPTION OF THE PREFERRED EMBODIMENT 10 is a magnetic field head slider testing apparatus, wherein 1 is a testing stage, 2 a handling robot, 3 a testing probe unit, 4 an external magnetic field generating device, 5 a pallet (see FIG. 3), 6 a pallet moving stage, 7 a measurement portion, 8 a measurement device and 9 a head slider (herein after will be called as slider and see FIGS. 3 and 4). The pallet 5 stores sliders 9 in many storage holes 5a aligned in length and breadth directions.

The testing stage 1 is an XY moving stage and is constituted by an X stage 11, a Y stage 12 provided on the X stage 11, a side face butt-positioning portion 13 provided at the upper portion over the Y stage 12 (see FIG. 5) and a back face butt-positioning portion 14 provided ajacent to the Y stage 12.

The side face butt-positioning portion 13 and the back face butt-positioning portion 14 respectively comprise contacting side faces to which the side face of the slider 9 and the leading edge (the back face with respect to the side where the connection terminals are provided) of the slider 9 respectively butt, and these contacting side faces are respectively in parallel with the X axis and Y axis and are in a positional relationship wherein both sides cross perpendicularly each other.

Figure 5:
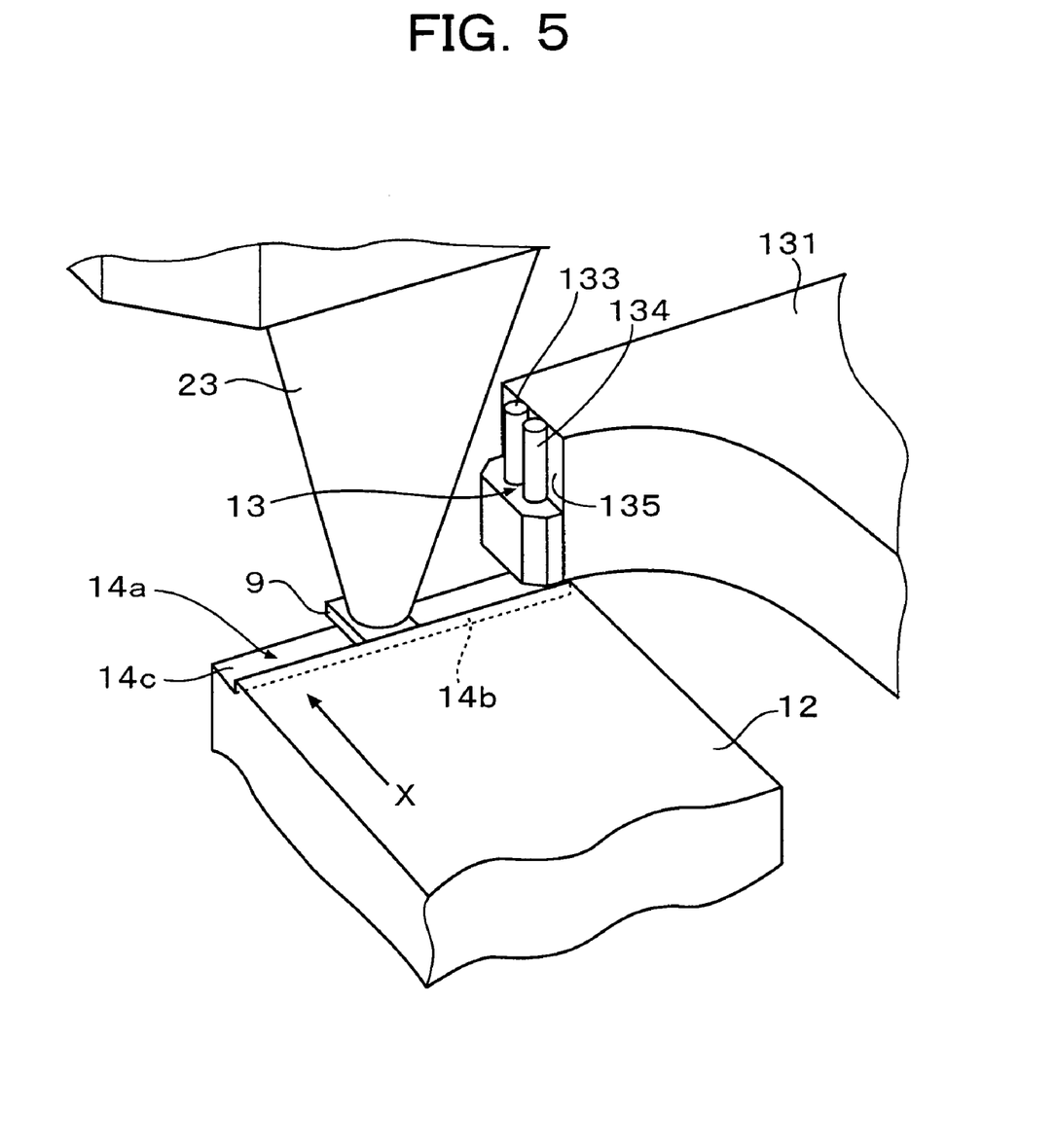
FIG. 5 is a diagram for explaining a side face butt-positioning portion.

The side face butt-positioning portion 13 is provided by forming a projection at a corner of a flat plate block 131 as shown in FIG. 5. The side face butt-positioning portion 13 includes a butting side face 135, at the butting side face 135 two pieces of pins 133 and 134 are provided and the side faces of these pins 133 and 134 constitute the contacting face for the side of the slider 9. The flat plate block 131 in FIG. 5 is secured to a base of the magnetic head slider testing apparatus 10 via a bracket 132 as shown in FIG. 1.

Figure 4:
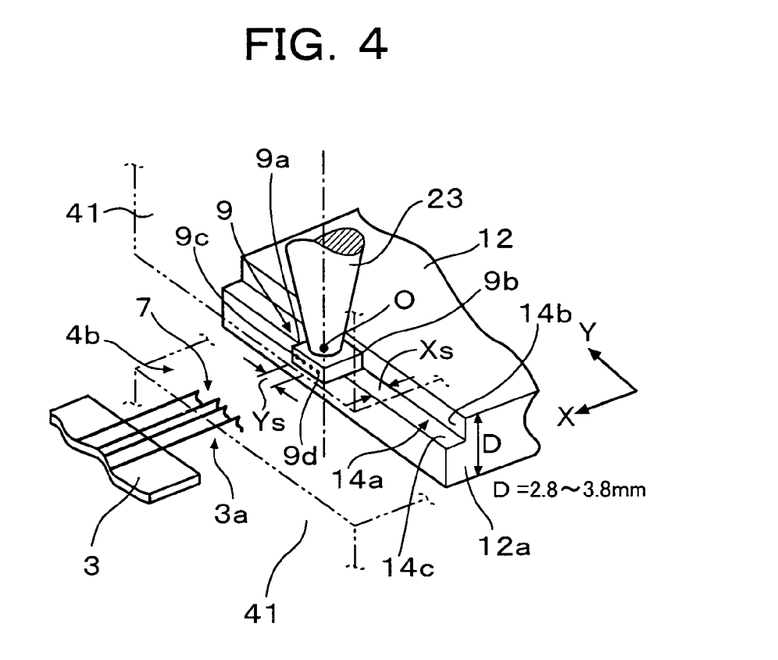
FIG. 4 is a diagram for explaining a relationship between the suction pick-up, a suction state of the slider and a probe.

The back face butt-positioning portion 14 is disposed at the mounting position of the slider 9 provided at the Y stage 12 as a step portion 14a as shown in FIGS. 4 and 5. The back face 14b (see the dotted portion in FIG. 5) of the step portion 14a serves as the contacting face to the leading edge of the slider 9.

Now, since the linear movement mechanism constituted by the X stage and the Y stage is an ordinary one, the detailed illustration thereof is omitted.

Figure 2:
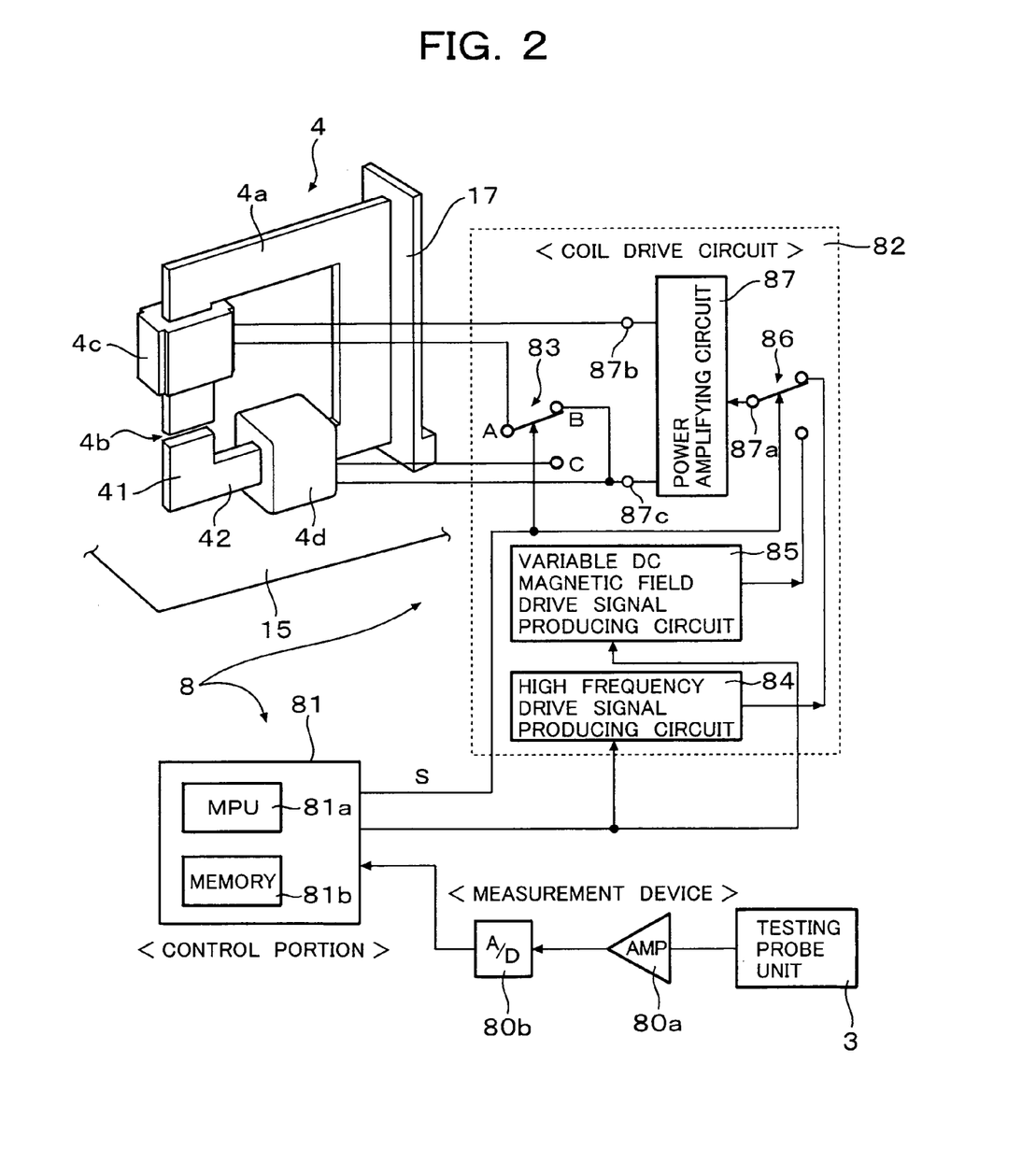
FIG. 2 is a block diagram showing a relationship between a coil drive circuit for generating an external magnetic field and an external magnetic field generating device for generating an external magnetic field.

The measurement device 8 is constituted by a control portion 81 and a coil drive circuit 82 as shown in FIG. 2. The control portion 81 is constituted by such as a controller computer inside of which a microprocessor (MPU) 81a, a memory 81b and a control program installed in the memory are built-in.

The coil drive circuit 82 is constituted by a coil connection change-over circuit 83, a high frequency drive signal producing circuit 84, a variable DC magnetic field drive signal producing circuit 85, an input signal change-over circuit 86 and power amplifying circuit 87 serving as the current output circuit.

The coil connection change-over circuit 83 changes over a terminal A to either a terminal B or a terminal C in response to a control signal S from the control portion 81.

The terminal A of the coil connection change-over circuit 83 is connected to the other terminal of the first coil 4c, the terminal B is connected to an output terminal 87b and the terminal C is connected to the other terminal of the second coil 4d.

Thereby, the first coil 4c is selectively connected to the out put of the power amplifying circuit 87 either after being connected in series with the second coil 4d or directly.

The input signal change-over circuit 86 selects one of drive signals (output signals) from the high frequency drive signal producing circuit 84 and the variable DC magnetic field drive signal producing circuit 85 and inputs the selected signal to the power amplifying circuit 87. The one output terminal 87b among the pair of output terminals of the power amplifying circuit 87 is connected to one terminal of the first coil 4c and the other terminal 87c is connected to the terminal B of the coil connection change-over circuit 83 and one terminal of the second coil 4d.

The high frequency drive signal producing circuit 84 and the variable DC magnetic field drive signal producing circuit 85 are respectively controlled by the control portion 81 and respectively generate drive signals for driving the respective coils.

Now returning to FIG. 1, the air gap 4b forms a space in a rectangular block corresponding to the lateral cross sectional shape of the frame core 4a. The testing probe unit 3 and the Y stage 12 are disposed in an opposing manner via the air gap 4b so as to face the space in the frame width direction of the frame core in X direction (lateral direction) which is perpendicular to the one side 41 standing up along Z axis. The Y stage 12 moves in X direction through the drive of the X stage and advances and retreats with respect to the air gap 4b.

Further, the frame core 4a is provided with a rectangular space inside thereof, the testing probe unit 3 and the Y stage 12 can be disposed so as to face the air gap 4b in Y direction (lateral direction), which is perpendicular to the width direction of the frame core 4a.

The testing probe unit 3 is secured to the frame 16 of the apparatus and is connected to the measurement device 8, and the top end portion of the probe 3a, which is hidden by the frame core 4a in FIG. 1 and cannot be seen, however as seen from FIG. 4, projects from the opposite side toward the air gap 4b so as to face the Y stage 12 in the measurement portion 7. A measurement signal obtained from the testing probe unit 3 is A/D converted via an amplifier 80a and an A/D 80b and is input to the measurement device 8 as shown in FIG. 2.

As shown in FIGS. 1 and 2, the external magnetic field generating device 4 is an electro magnet, is constituted by a frame core 4a including the air gap at the position of the measurement portion 7 and the first coil 4c and the second coil 4d (see FIG. 2) wound around the core and is secured to the base 15 of the magnetic head slider testing apparatus 10 via the bracket 17 (see FIG. 2). The external magnetic field generating device 4 is driven when the coils 4c and 4d receive power supply from the coil drive circuit 82.

As shown in FIG. 4, the top end portion (top ends of needles) of the probe 3a in the testing probe unit 3 reaches the end of the narrow air gap 4b and of which part enters therein. The Y table 12 opposing the portion includes a top end portion 12a having a thinner thickness D than the width of the air gap 4b. Therefore, when the slider 9 is tested, the table 12 advances toward the air gap 4b and the top end portion 12a of the Y table 12 is inserted into the air gap 4b, and the slider 9 positions substantially at the center portion in the vertical direction in the space of the air gap 4b and contacts with the probe 3a inside the air gap 4b. Under this condition, a magnetic field is applied to the slider 9 and the testing is performed.

The part of the top end portion 12a to be inserted in the air gap 4b is formed of a nonmagnetic and electrical conductive resin and the thickness D of the top end portion 12a is 2.8 mm~3.8 mm. Since the top end portion 12a is formed of a nonmagnetic and electrical conductive resin, the measurement of the slider 9 subjected to the magnetic field application is not affected as well as the slider 9 is prevented from damaging.

The first coil 4c is formed by winding a copper wire having a diameter of 0.3~0.6 mm$\phi$ by about 70~80 turns around the side 41 with the air gap 4b of the frame core 4a and above the air gap 4b, and the inductance thereof is about 0.8 mH~1 mH. On the hand, The second coil 4d is formed by winding a copper wire having the same diameter of 0.3~0.6 mm$\phi$ by about 100~120 turns around the lower side 42 adjacent the side with the air gap 4b of the frame core 4a and the inductance thereof is about 1 mH~1.5 mH.

The outer size of the frame core 4a is in a range of 80 mm×120 mm~90 mm×130 mm, the frame width thereof is about 20 mm~30 mm, the thickness thereof is about 3 mm~6 mm and the length of the air gap 4b is about 3 mm~7 mm, which permits insertion of the slider 9 through advance and retreat.

Further, the first coil 4c is disposed on the side 41 at a position, which does not disturb the movement of the Y table 12 toward the air gap 4b.

In FIG. 2, when the coil connection change-over circuit 83 connects the terminal A with the terminal B in response to the control signal S from the control portion 81 and changes over to the side of the high frequency magnetic field generation, the power amplifying circuit 87 is connected only to the first coil 4c and is not connected to the second coil 4d. On the other hand, when in response to another control signal S the coil connection change-over circuit 83 connects the terminal A with the terminal C and changes over to the side of the DC magnetic field generation, the first coil 4c and the second coil 4d are connected in series and the series circuit is connected to the power amplifying circuit 87.

The control signal S is also input to the input signal change-over circuit 86 and when the terminal A and the terminal B of the coil connection change-over circuit 83 is connected, the input signal change-over circuit 86 selects in response to the control signal S the output signal of the high frequency drive signal producing circuit 84 as an input signal and inputs the same to the power amplifying circuit 87. In response thereto, the power amplifying circuit 87 supplies to the coil, for example, a high frequency drive current (AC drive current more than 200 Hz) of about 10 kHz. In this instance, the high frequency drive signal producing circuit 84 is controlled by the control portion 81 and the magnitude of the drive current is controlled and the intensity of the magnetic field applied to the MR head is adjusted, thereby, a magnetic field exceeding over 200 Oe is generated in the air gap 4b.

The frequency of the high frequency magnetic field is selected from a range of about 5 kHz~20 kHz.

On the other hand, when the terminal A and the terminal C of the coil connection change-over circuit 83 is connected, the input signal change-over circuit 86 selects in response to the control signal S the output signal of the variable DC magnetic field drive signal producing circuit 85 as an input signal and inputs the same to the power amplifying circuit 87. In response thereto, the power amplifying circuit 87 supplies to the coil a DC drive current. In this instance, the variable DC magnetic field drive signal producing circuit 85 is controlled by the control portion 81, and the magnitude and direction of the drive current is controlled. Thereby, the intensity and the direction of the magnetic field applied to the MR head are controlled.

The testing probe unit 3 is secured to the frame 16 of the apparatus and is connected to the control portion 81 via the amplifier 80a and the A/D 80b. As has been explained above, when performing the test of applying a magnetic field to the slider 9, since the top end portion (see FIG. 4) of the probe 3a contacts the slider 9 in the measurement portion 7, a measurement signal is obtained from the testing probe unit 3 and is A/D converted by the A/D 80b and is input to the control portion 81.

When performing the quasi-magnetic response characteristic testing (QUASI-TEST), the control portion 81 changes over the coil connection change-over circuit 83 to the side of the high frequency magnetic field generation by issuing a control signal. In response thereto, the power amplifying circuit 87 drives the first coil 4c with a high frequency current.

In this instance, through the control of the control portion 81, the high frequency drive signal producing circuit 84 produces signals successively so as to generate a sinusoidal wave, for example, of about 10 kHz having a predetermined amplitude for a predetermined period in response to the + side writing signal, thereafter to render the amplitude of the sinusoidal wave to 0 for a predetermined period, further thereafter, to generate sinusoidal wave for a predetermined period in response to the − side writing signal and then to render the amplitude of the sinusoidal wave to 0 for a predetermined period.

Assuming the above sequence as one cycle, in order to repeat the same cycle in many times, the control portion 81 causes the high frequency drive signal producing circuit 84 to produce the drive signals. The control portion 81 causes the high frequency drive signal producing circuit 84 to repeat the cycle about 500 times, and at the same time stores read signals from the MR head at this instance sequentially as measurement data in its internal memory via the amplifier 80a and the A/D 80b.

On the other hand, when performing the hysteresis characteristic testing on the slider 9 as a magnetic material, the control portion 81 generates the control signal S and changes over the coil connection change-over circuit 83 to the side of the DC magnetic field generation. The power amplifying circuit 87 drives the series circuit of the first coil 4c and the second coil 4d with a DC current.

In his instance, the DC drive current is a step current in which the magnitude of the current varies in a step manner or a pulse shaped current in which amplitude thereof is successively changes. In case of the pulse shaped current, it is preferable that the leading edge rises in a sinusoidal manner and after rising up a DC condition is kept.

In this instance, through the control by the control portion 81 the variable DC magnetic field drive signal producing circuit 85 at first produces an output signal which causes to generate varying magnetic field (+ side magnetic field) directing downward in the air gap 4b. Through the DC output current from the power amplifying circuit 87, the intensity of the magnetic field in the air gap 4b gradually increases from "0" toward a predetermined value, and contrary after reaching the predetermined value decreases toward "0". Subsequently, the variable DC magnetic field drive signal producing circuit 85 produces another output signal which causes to generate varying magnetic field (− side magnetic field) directing oppositely upward in the air gap 4b. Through the DC output current from the power amplifying circuit 87, the intensity of the magnetic field in the air gap 4b gradually increases from "0" toward a predetermined value in − side, and contrary after reaching the predetermined value decreases oppositely toward "0". Then at the same time the control portion 81 stores read signals from the MR head at this instance sequentially as measurement data in its internal memory via the amplifier 80a and the A/D 80b.

Now, a slider handling processing for positioning the slider 9 on the Y table at XYZ coordinate position will be explained. In the preset positioning, the Y table is immovable in Y direction and constituted integral with the X table.

Now, returning to FIG. 1, the handling robot 2 serves as the YZ moving stage, and through supporting the side face of a Z stage with a Y stage, the Z stage is permitted movable in vertical direction. The Y stage is connected to a Y direction moving mechanism (not shown) via an arm 21a. The Z stage 22 is provided with a suction pick-up (a suction collet of which top end is conical shape, see FIG. 4) 23, which is attached on the bottom face of the stage so as to extend downward.

The suction pick-up 23 sucks and holds a slider 9 from the pallet 5, and through YZ movement thereof, the suction pick-up 23 moves back and forth in Y direction along a parallel line with Y axis and transfers the slider 9 on to the Y table 12 of the testing stage 1, and oppositely, stores the already tested slider 9 on the Y table 12 of the testing stage 1 at the original position in the pallet 5.

As shown in FIG. 4, the diameter of the top end portion of the suction pick-up 23 is configured smaller than the outer circumferential shape of the slider 9 in a rectangular shape.

In FIG. 1, a pallet moving stage 6 is an X direction moving stage mounting the pallet 5 and the pallet 5 is moved in X direction so that a slider 9 of a testing object (the position of the concerned storage hole 5a, see FIG. 3) moves under the pick up position in Y direction of the suction pick-up 23 of the handling robot 2. The position of the pallet 5 is controlled by the measurement device 8 via the pallet moving stage 6.

Figure 3:
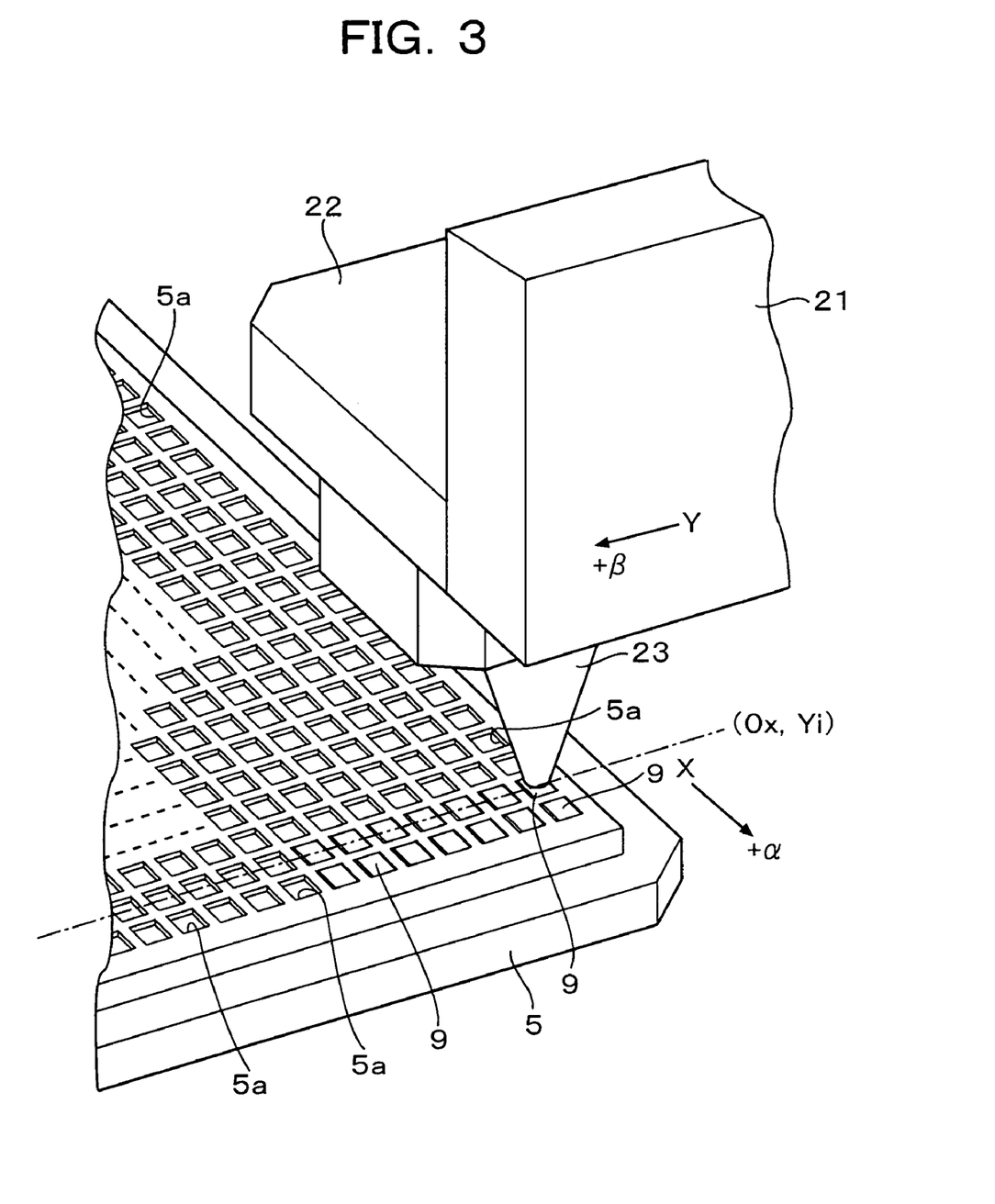
FIG. 3 is a diagram for explaining a relationship between a head sliders stored in a pallet and a suction pick-up.

As shown in FIG. 3, the slider 9 is sucked from the storage hole 5a in the pallet 5 with the suction pick-up 23. The storage hole 5a is a rectangular hole of one size larger than the slider 9. As a suction position offset processing in there, at first in the pallet 5 the perpendicularly crossing two side faces in XY directions of the slider 9 are butted individually and successively to the perpendicularly crossing two side faces in XY directions of the storage hole 5a and the suction position of the slider 9 is corrected. Thereby, the offset positioning with regard to the suction position of the slider 9 is performed. This is because since the X side face 9a and Y side face 9b of the slider 9 (see FIG. 4) are butted afterward and the suction position for the slider 9 will be shifted, the suction position is moved beforehand in the opposite direction thereof and an offset is provided with respect to the XY positioning position of the slider 9 in this processing. In other words, this offset operation is to offset the suction position beforehand to a coordinate position (Xs+α, Ys+β) so that the suction center (which corresponds to the center O of the slider 9, see FIG. 4) of the suction pick-up 23 will be corrected to a normal coordinate position (Xs, Ys) (see FIG. 4) in the side face butt positioning portion 13 and the back face butt positioning portion 14. However, α and β shown in FIG. 3 are arbitrary offset amounts.

After the above operation, the Z stage 22 is driven and the slider 9 is picked up by the suction pick-up 23. Subsequently, through driving the Y stage 21, the slider 9 is moved in Y direction together with the suction pick-up 23 and the side face along X direction (X side face) 9a of the slider 9 is butted to the contacting face (see FIG. 5) in the side face butt positioning portion 13, then after adjusting the suction position thereof in Y direction, the slider 9 is mounted on the step portion 14a (see dotted front face portion of the stage 12 in FIGS. 4 and 5) of the Y stage 12. Further subsequently, the X stage 11 is advanced and the side face along Y direction (leading edge of the slider 9) 9b (see FIG. 4) of the slider 9 is butted to the back face 14b (contacting side face) of the step portion 14a in the back face butt positioning portion 14. Thereby, since the slider 9 is pushed out, the position in X direction is adjusted. After this operation, the slider 9 is sucked by negative pressure from a suction hole (which is under the slider 9 in FIG. 5 and is not seen) provided at the bottom face 14c (see FIG. 5) of the step portion 14a and is fixed on the step portion 14a. Thereby, the positioning of the slider 9 in Z direction is performed.

Nextly, through movement of the X stage 11, the Y stage 12 is moved toward the air gap 4b, the top end portion 12a of the Y stage 12 is inserted inside the air gap 4b and the side face (trailing edge of the slider 9) having the four connection terminals 9d (see FIG. 4) of the slider 9 is pushed out toward the testing probe unit 3. Wherein he four connection terminals 9d provided on the terminal side face 9c (see FIG. 4) of the slider 9 are contacted to the probe 3a in the testing probe unit 3 and thereafter the testing begins.

As will be understood from the above, the bottom face 14c of the step portion 14a serves as a positioning face in Z direction for the slider 9, namely in the height direction with reference to the face of the base. The height of the air gap 4b is set at a position corresponding to the positioning position in Z direction. Therefore, by making thin the thickness of the top end portion 12a of the Y stage 12, the top end portion 12a can be easily inserted into the air gap 4b.

During butting in the side face butt positioning portion 13 and the back face butt positioning portion 14 the coordinate position of the suction center (which corresponds to the center O of the slider 9) of the suction pick-up 23 with respect to the slider 9 assumes (Xs, Ys). The coordinate position is the normal suction position, the slider 9 is positioned in high speed and with high accuracy to this condition during the transfer process and is fixed as the test position at the position of the suction hole in the Y stage 12 of the testing stage 1. With this operation, the positioning in height direction (Z direction) is completed and the four connection terminals 9d on the terminal face 9c are correctly contacted to the probe 3a of the testing probe unit 3.

After contacting the four connection terminals 9d to the probe 3a of the testing probe unit 3, the control portion 81 generates a predetermined control signal S to drive the high frequency drive signal producing circuit 84 and begins the quasi magnetic response characteristic test (QUASI-TEST), thereafter, further generates another predetermined control signal S to perform the hysteresis characteristic test and stores the sampled measurement data respectively in the internal memory 81b. Then good or bad of the slider (MR head) 9 is judged based on the measurement data of the read signals of the MR head stored in the internal memory 81b.

Figure 6:
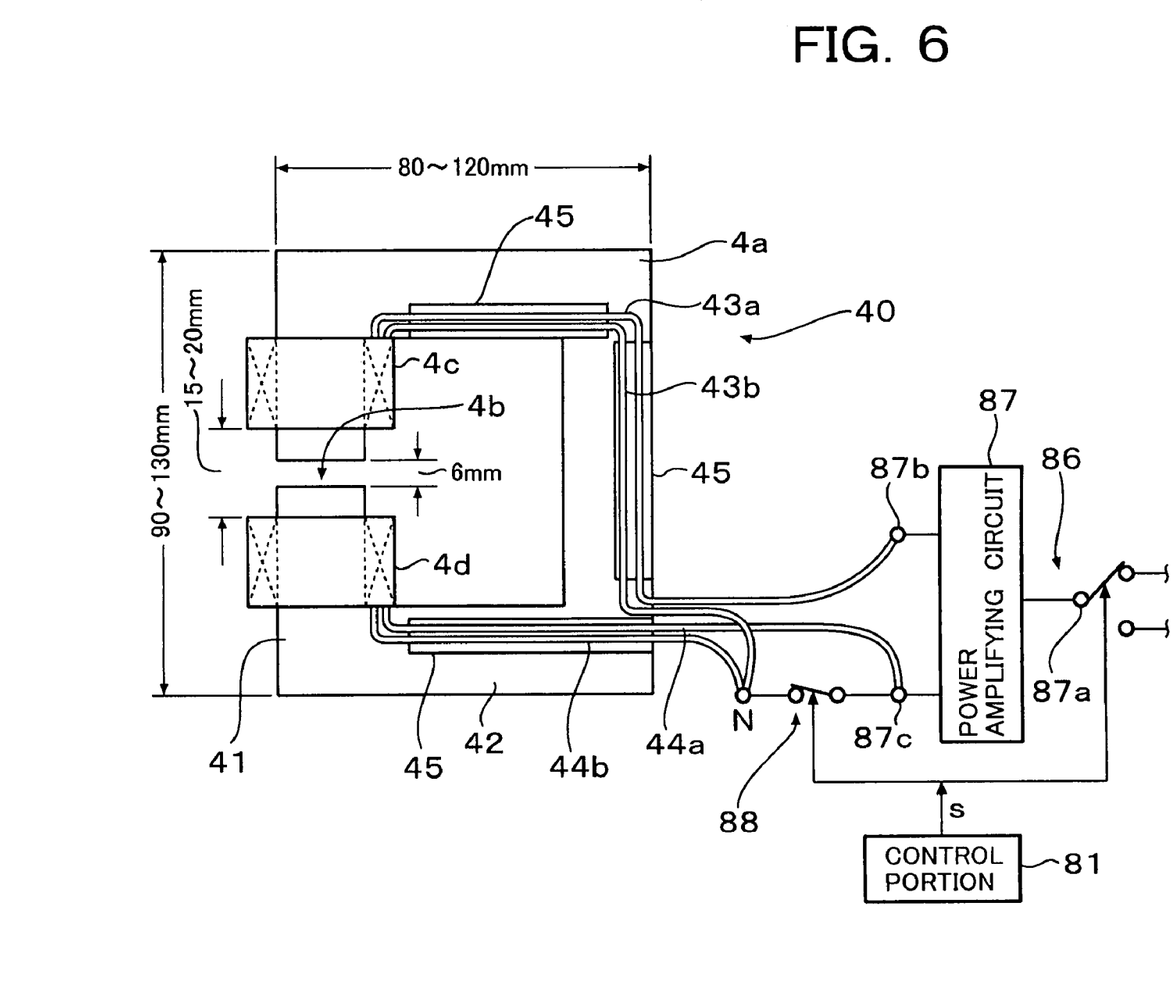
FIG. 6 is a diagram for explaining a relationship between a core and coils in another specific example of the external magnetic field generating device.

FIG. 6 is a diagram for explaining a relationship between a core and coils in another specific example of the external magnetic field generating device.

In the external magnetic field generating device 40, the first coil 4c and the second coil 4d are provided in up and down relation at either side of the air gap 4b on the side 41 of the rectangular shaped core 4a. The second coil 4d in FIG. 1 is moved from the side 42 to the side 41 and disposed down side of the air gap 4b.

The distance D between the first coil 4c and the second coil 4d is 15 mm~20 mm, the number of turns of the first coil 4c and the second coil 4d is equal and is from 90 turns to 100 turns. The wind thickness of the coils on the frame core 4a is about 6 mm.

Since the thickness of the top end portion 12a of the Y table 12 is 2.8 mm~3.8 mm, these coils never disturb the Y stage 12, when the top end portion 12a of the Y stage 12 is advanced and is inserted into the air gap 4b.

Since the connection lead wires of the first coil 4c and the second coil 4d may disturb, respective lead wirings 43a, 43b and lead wirings 44a, 44b cause to run along a guide channel case and are led out to the back side opposite to the side 41. The lead wirings 43b and 44b are connected to a connection terminal N outside the frame core 4a.

Namely, the first coil 4c and the second coil 4d are beforehand connected in series at the connection terminal N.

In the case of this external magnetic field generating device 40, since the number of turns of the coils is the same, when one of the first coil 4c and the second coil 4d is selectively driven, a high frequency magnetic field can be generated. In this embodiment, such an example is shown in that in place of the connection change-over circuit 83 in FIG. 1, through ON/OFF of a switch circuit 88, the first coil 4c among the series connected first coil 4c and second coil 4d is selected and connected to the power amplifying circuit 87.

The switch circuit 88 is provided between the connection terminal N connecting the first coil 4c and the second coil 4d and the output terminal 87c of the power amplifying circuit 87 and is turned ON/OFF by the control signal S from the control portion 81. When the switch circuit 88 is turned OFF, a DC drive current is flowed to the first coil 4c and the second coil 4d under series connected condition from the power amplifying circuit 87 so as to generate a DC magnetic field in the air gap 4b. On the other hand, when the switch circuit 88 is turned ON, a high frequency current (AC drive current more than 200 Hz) is flowed to the first coil 4c from the power amplifying circuit 87 to generate a high frequency magnetic field in the air gap 4b.

Further, if the switch circuit 88 is provided between the connection terminal N and the output terminal 87c of the power amplifying circuit 87, the second coil 4d is selected other than the first coil 4c.

Although in the above embodiments, the testing of the slider 9 under a single body condition, the present invention can be applied to a head slider before cutting out the same to individual slider single bodies.

Figure 7:
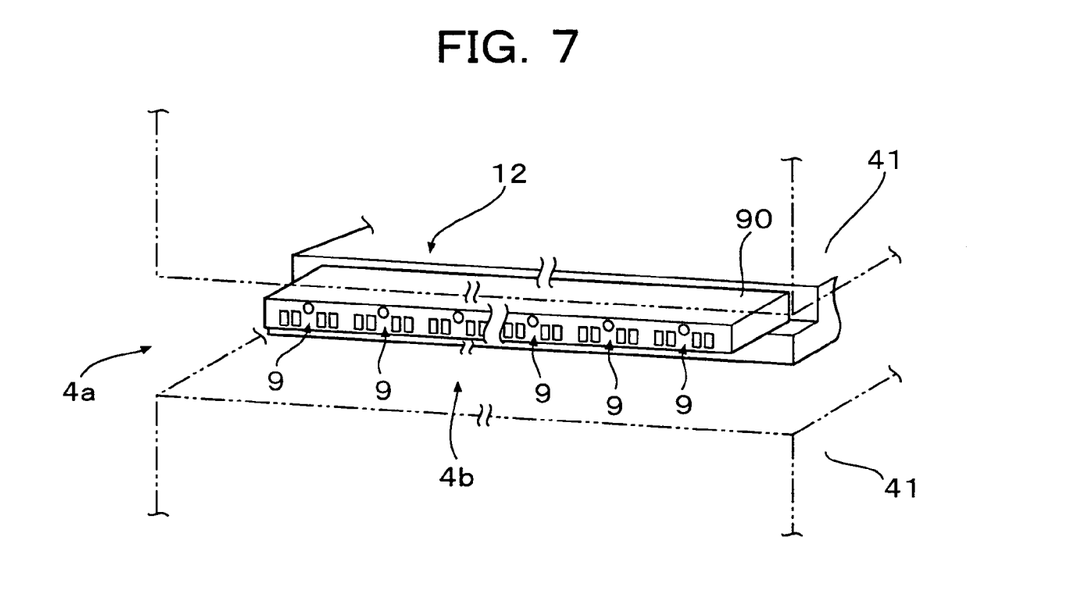
FIG. 7 is a diagram for explaining a block of sliders arranged.

90 as shown in FIG. 7 is a slider array block called as a long and narrow row bar which is cut out from a wafer under a condition that sliders of about 40~60 pieces are formed on one line in the line direction of the wafer.

When testing these slider array block, the frame width of the frame core 4a in FIGS. 2 and 6, of which side 41 is shown by two dots and lines, has to be larger than the slider array block in its longitudinal direction. Therefore, the inside rectangular space of the frame core 4a becomes small correspondingly. The step 14a of the Y stage 12 elongates in the frame width direction in the space of the air gap 4b to have a large width. The width of the probe 3a likely elongates. The relationships other than the above are substantially the same as in the case in FIG. 1.

Accordingly, the head slider as referred to in the present specification and the appended claims includes the slider array block before cutting out the same to individual slider single bodies.

As has been explained hitherto, although the testing stage 1 in the embodiments serves as an XY moving stage, however, in the present invention, such as fine adjustment in Y direction is not required for the Y stage, the Y table in the XY moving stage does not need to be separated but can be formed integral with the X table.

Further, in the present embodiments, although the frame core 4a for the external magnetic field generating device 4 is a rectangle, however, in the present invention the shape thereof is not limited to the rectangle, and when two coils are disposed via the air gap as shown in FIG. 6, a loop shaped core with an air gap is satisfactory.

Still further, although in the embodiments the testing of sliders for complex heads with an MR head is exemplified, the present invention is of course not limited to the testing of sliders for complex heads with an MR head.

The invention claimed is:

1. A magnetic head slider test apparatus, which tests a magnetic head characteristic of a slider head under a condition that the slider head has at one side face thereof a plurality of connection terminals to be connected to the magnetic head, comprising;
   a frame shaped core having an air gap,
   a first and second coil provided on either side of the air gap for generating magnetic field of a predetermined intensity in the air gap,
   a probe provided for contacting the plurality of connection terminals and
   a table on which the head slider is mounted and which is able to advance and retreat with respect to the air gap so as to insert the head slider into the air gap,
   wherein the probe and the table are disposed on either side of the air gap in the direction perpendicular to the core,
   through advancing the table the slider head is inserted in the air gap and the plurality of the connection terminals are contacted with the probe, and
   for generating a DC magnetic field in the air gap the first coil and the second coil are connected in series and a predetermined drive current is flowed therethough and for generating a high frequency magnetic field in the air gap an AC drive current of more than 200 Hz is flowed through either the first coil or the second coil.

2. A magnetic head slider test apparatus according to claim 1, wherein the core is a rectangular shape having the air gap at one side thereof, the first coil is provided on the one side and the second coil is provided on either the one side or one of remaining other sides thereof.

3. A magnetic head slider test apparatus according to claim 2, wherein the head slider is a slider array block, which is formed by aligning many number of sliders in an array.

4. A magnetic head slider test apparatus according to claim 2, wherein the magnetic head includes an MR head, the probe is disposed in such a manner that the top end portion thereof is either positioned at the end of the air gap or inserted inside the air gap and the table holds the head slider at the top end portion thereof.

5. A magnetic head slider test apparatus according to claim 4, wherein the top end portion includes a step portion, the slider head is mounted on the step portion, the thickness of the top end portion is smaller than the distance of the air gap and when the table is advanced, the top end portion is permitted to be inserted in the air gap.

6. A magnetic head slider test apparatus according to claim 5, wherein the head slider is sucked and held on the step portion, the bottom face of the step portion serves as a positioning face for the head slider in the height direction with reference to a base surface and the height of the air gap is set with respect to the positioning face.

7. A magnetic head slider test apparatus according to claim 6, wherein the distance of the air gap is in a range of 3 mm~7 mm, the height direction is Z direction in the apparatus, the head slider is mounted on the step portion after positioning in X and y directions and the first coil and the second coil are disposed at either side of the air gap on the one side of the core.

8. A magnetic head slider test apparatus according to claim 6, further comprising; a DC magnetic field drive signal producing circuit which produces a first drive signal for generating the DC magnetic field, a high frequency drive signal producing circuit which produces a second drive signal for generating the high frequency magnetic field, a current output circuit and a change-over circuit, wherein the current output circuit selectively receives one of the first drive signal and the second drive signal, when the first drive signal is received, generates the predetermined drive current, and when the second drive signal is received, generates the AC drive current, and when the predetermined drive current is flowed, the change-over circuit connects the first coil and the second coil in series and when the AC drive current is flowed, the change-over circuit selects one of the first coil and the second coil.

9. A magnetic head slider test apparatus according to claim 8, wherein the change-over circuit includes a first, second and third terminal, one of a pair of output terminals of the current output circuit is connected to one terminal of the first coil, the other terminal of the first coil is connected to the first terminal, the remaining output terminal of the current output circuit is connected to one terminal of the second coil and the second terminal, the other terminal of the second coil is connected to the third terminal and the change-over circuit performs connection change over of the first terminal either to the second terminal or the third terminal.

10. A magnetic head slider test apparatus according to claim 8, wherein the change-over circuit is a switch circuit, the first coil and the second coil are connected in series, one of a pair of output terminals of the current output circuit is connected to one terminal of the series connected coils, and the remaining output terminal of the current output circuit is connected to the other terminal of the series connected coils as well as is connected to the connection point of the series connected first coil and second coil via the switch circuit.

11. A magnetic head slider test apparatus according to claim 6, wherein the distance of the air gap is in a range of 3 mm~7 mm, the height direction is Z direction in the apparatus, the head slider is mounted on the step portion after positioning in X and y directions, the number of turns of the second coil is more than that of the first coil and is disposed on one of the remaining other coils and the AC drive current is flowed to the first coil.

12. A magnetic head slider test apparatus according to claim 4, wherein the frequency of the AC drive current is a predetermined frequency in a range of 5 kHz~20 kHz, the high frequency magnetic field is applied to the MR head in the air gap so as to test a quasi magnetic response characteristic of the MR head, the DC magnetic field drive signal producing circuit is permitted to vary the predetermined drive current and the DC magnetic field is applied to the MR head in the air gap so as to test a hysteresis of the MR head.

13. A magnetic head slider test method, which tests a magnetic head characteristic of a slider head under a condition that the slider head has at one side face thereof a plurality of connection terminals to be connected to the magnetic head,
wherein a probe and a table are disposed at either side of an air gap in the direction perpendicular to the air gap forming direction of a frame shaped core, on which a first coil and a second coil are provide at either side of the air gap, the method comprising;
the step of mounting the head slider on the table,
the step of advancing the table on which the head slider is mounted, inserting the head slider into the air gap and contacting a plurality of connection terminals with the probe,
the step of DC magnetic field generation including connecting the first coil and the second coil in series, flowing a predetermined current therethrough and generating a DC magnetic field in the air gap, and
the step of high frequency magnetic field generation including flowing through either the first coil or the second coil an AC drive current of more than 200 Hz and generating a high frequency magnetic field in the air gap.

14. A magnetic head slider test method according to claim 13, wherein the magnetic head includes an MR head, the probe is disposed in such a manner that the top end portion thereof is either positioned at the end of the air gap or inserted inside the air gap and the table holds the head slider at the top end portion thereof.

15. A magnetic head slider test method according to claim 14, wherein the head slider is a slider array block, which is formed by aligning many number of sliders in an array.

* * * * *